United States Patent
Nizzari et al.

[11] Patent Number: 6,014,647
[45] Date of Patent: Jan. 11, 2000

[54] CUSTOMER INTERACTION TRACKING

[76] Inventors: Marcia M. Nizzari, 360 Central Ave., Needham, Mass. 02194; Keith D. McNeill, 55 Magee St., Cambridge, Mass. 02139

[21] Appl. No.: 08/889,352

[22] Filed: Jul. 8, 1997

[51] Int. Cl.[7] .................................................. H04N 1/413
[52] U.S. Cl. .................... 705/39; 395/200.46; 705/39; 707/1; 707/3
[58] Field of Search ................. 395/200.33, 200.46, 395/200.47, 200.49, 200.61; 705/39; 707/1, 3, 6, 10, 102, 104

[56] References Cited

U.S. PATENT DOCUMENTS 5,737,726  4/1998  Cameron et al. ............................ 705/7

*Primary Examiner*—Thomas R. Peeso
*Attorney, Agent, or Firm*—Fish & Richardson P.C.

[57] ABSTRACT

A method for processing transaction data to provide easy access to customer interaction information that may not have been otherwise available or easily accessible. Mining stored information related to interactions with a customer produces personalized customer information that is stored in an interaction database. The personalized customer information is retrieved from the interaction database and used while interacting with the customer. The invention also provides a method for customized interaction processing. The structure of data stored the interaction database and rules are specified by meta data. The invention also provides a method for arranging references to stored interaction information in multiple disparate databases.

40 Claims, 4 Drawing Sheets

CUSTOMER INTERACTION TRACKING

BACKGROUND OF THE INVENTION

This invention relates to data processing, and in particular relates to processing and storing transaction information.

A business that interacts with large numbers of customers and clients, over a variety of channels including telephone, mail, and in person, may log those interactions. This logged information can be used for a variety of reasons including providing better service to the customers and clients and identifying existing customers and clients to whom new services should be offered. In a telephone call center interaction, for example, the information on a caller's recent interactions may be displayed to an agent handling the call. Today, basic information about a call may be provided on a computer screen as a "screen pop" for the agent receiving the call. For example, the calling number obtained through the telephone network can be used to look up a customer record and that record can be displayed to the agent.

When a single customer can interact with the business over a variety of channels, the transaction records from the various channels must be merged to provide a complete record for that customer. However, the systems used to support these different channels may be independent and not share common databases or other infrastructure. Merging the transaction records may require considerable effort and data processing infrastructure. Furthermore, the procedures used to merge the records may be specific to a particular business.

Recently, organizations have recognized that substantial amounts of valuable business information can be obtained by "mining" their transaction records and other customer databases. The result of this type of mining often identifies trends or is used to segment the customer base. An example of this segmentation might be identifying a subset of customers to target in an outbound telemarketing campaign. As in the case of merging transaction records, the procedures for data mining may also be specific to a particular business.

Customization of systems for handling transaction information can be accomplished using a variety of approaches. The system can be entirely custom built for a business to address its particular requirements. This is costly and increases the effort required for ongoing customization. The system can be built to address the requirements of a particular business using a software "toolbox" that includes reusable components that are applicable to different business. Customizable systems have also used the concept of "meta data" that define the customized aspects of the system. These meta data are then interpreted at runtime to access the custom aspects of the system. Such a meta data approach can be computationally inefficient and may not support scaling to very large systems. In addition, since all customized access to the system must use the meta data, access software must be aware of the meta data. This may limit the type of access software used to interact with the system.

SUMMARY OF THE INVENTION

In general, in one aspect, this invention provides an efficient way of processing transaction data to provide easy access to customer interaction information that may not have been otherwise available or easily accessible.

In one aspect, in general, the invention provides a method for processing an interaction between a customer and a business including mining stored information related to interactions with the customer. The mining produces personalized customer information that is stored in an interaction database. The personalized customer information is retrieved from the interaction database and used while interacting with the customer.

In another aspect, in general, the invention provides a method for customized interaction processing. The customization steps include accepting meta data, customizing an interaction database such that the structure of data stored the interaction database is specified by the meta data, storing rules specified by the meta data, processing stored interaction information in accordance with the stored rules, and storing the result of processing the stored interaction information.

In another aspect, in general, the invention provides a method for arranging references to stored interaction information in a plurality of disparate databases. The steps for arranging the references include storing multiple transaction records each referencing one or more records in the disparate databases, grouping the transaction records into groups of transactions records, storing event records each referencing one of the groups of transaction records, grouping the event records into groups of event records, storing interaction records each referencing one of the groups of event records, grouping the interaction records into groups of related interaction records, storing container records each referencing one of the groups of related interaction records, and accessing a record in one of the disparate databases in accordance with references in a container or a interaction record.

Embodiments of the invention include one or more of the following features. An interaction with a customer can include an operator speaking to a customer and the personalized customer information is presented to the operator. An interaction with a customer can be automated. An automated interaction can include communicating with the customer by voice over a telephone channel. A destination where to route a telephone call with a customer can be determined automatically, and the call routed to that destination. An automated interaction can include communicating with the customer over a data channel, such as over a packet switched network like the Internet. Personalized customer information can include a characterization of previous interactions with the customer or can indicate a customer's membership to a defined group of customers. Mining of the stored information can include detecting patterns in elements of the stored information. Stored information can include a variety of data types including natural language text passages, a stored images, and an audio recordings. Mining can also include grouping of elements of the stored information or tracking a series of interactions with the customer that occurred at different times. Customization can include extending the schema of a relational database. Data in the relational database can be accessed using the extended schema. Customization can also involve accepting a meta data specification and compiling the meta data specification to produce the meta data used in the runtime system. Stored information that can be processed with a particular stored rule can be determined by the system. This determination can be made while interacting with the customer. The stored rules can be used to detect unexpected events which occur while interacting with a customer.

Advantages of the invention include managing customer information in a manner that provides useful information to an agent or automated system interacting with a customer. Another advantage is that the runtime system does not have to be reprogrammed when custom features are added. Furthermore, since meta data are used to configure the system before runtime rather than being used solely by interpreting meta data at runtime, system operation is computationally more efficient than completely interpreted use of meta data. In addition, since data is represented in structure native to the underlying database system, access to the system does not necessarily require interpreting meta data. Standard software access tools can therefore be used in conjunction with the system. Customization using a data model including entity and relationship objects provides structure for easy access to related records. A hierarchical data model for interactions with a customer allowing several levels of granularity provides structure for easy access to records related to a particular customer. The invention also supports improved customer service through efficient access to customer information, reduced cost of interacting with customers through efficient handling of interactions, and increased sales opportunities by better targeting of groups of customers.

DESCRIPTION OF THE PREFERRED EMBODIMENT

Figure 1:
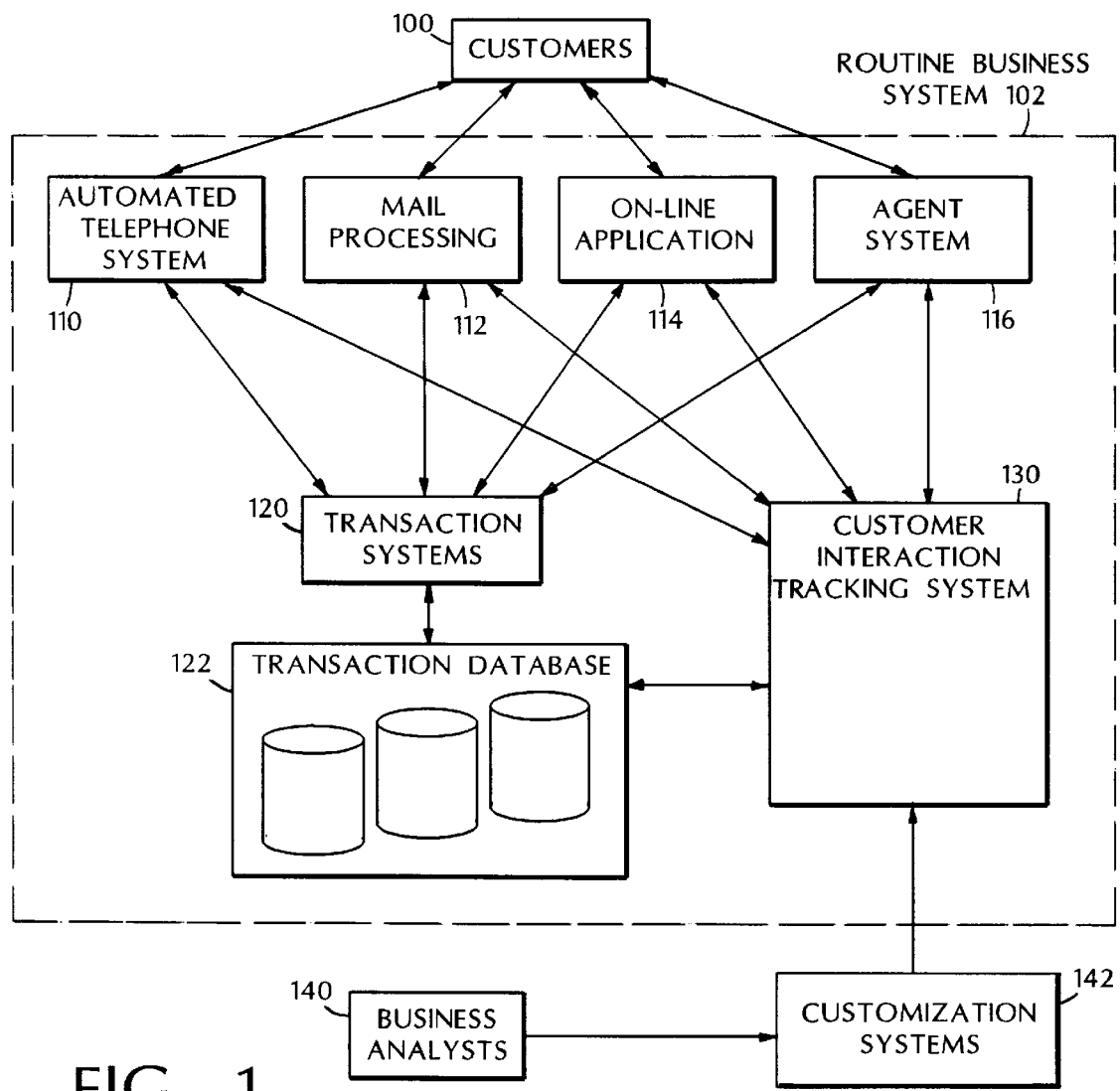
FIG. 1 shows a customer interacting with a business system through a variety of access points.

Referring to FIG. 1, customers 100 can interact with a runtime business system 102 in a variety of ways. They may interact in person or over the telephone with an agent system 116 in which an agent or operator is a gateway to information and services provided by the business. Another method of interacting with a business is through the mail. Written correspondence is received in a mail processing system 112 and processed, typically in batches. It is increasingly common for the customer to interact with an automated telephone system 110, for example to receive account information or to conduct simple transactions. The user receives voice commands from the system and responds by manual input using a telephone keypad or by voice if automated speech recognition is available. Finally, the customer may interact through an online computer application 114 connected over a data channel to the business. The data channel may be a modem connection over a telephone channel from a terminal or computer at the customer's site. The data channel may also couple a client application at the customer's site to the business system over a data network such as the Internet. The client application may be a Web browser coupled to a Web server that is part of the runtime business system. Each of these access points to runtime business system 102 makes use of transaction systems 120 which in turn use and maintain transaction databases 122. Transaction databases 122 include such data as customer information, account information, and other data needed to conduct business transactions. Transaction systems 120 satisfy the basic requirements of the business but may not include customized features for the business. Transaction databases 122 include tabular numeric and character string data, and can also include free text data, scanned images, and recorded voice from telephone interactions. Some of the data, in particular the tabular data, have specific semantic meaning associated with a particular field in a database, for example, a transaction date. Other data are uninterpreted such as free text of journal notes entered by an agent during a telephone conversation. It is also common that transaction databases 122 do not share a common infrastructure. For example, a digital telephone call logging system may not share any infrastructure with a table-based transaction recording system.

An interaction with the customer has several logical "contexts." For example, there is the context of basic customer information, such as account number, name, address, and telephone number. There may be a financial context including the status of various accounts. If a workflow system is being used to coordinate a sequence of interactions, the interaction has a workflow context. There is also an interaction context that can include a wide variety of information related to the customer's past interactions with the business. This information can include a history of phone calls, letters, faxes, in-person interactions, Internet messages and other communication; relationships to other events, such as a follow-up of previous requests; detailed transaction records, such as scanned letters and voice recordings; identities of previous points of contact; and preferred interaction style.

Referring to FIG. 1, customer interaction tracking system 130 focusses on the interaction context. In particular, customer interaction tracking system 130 is used to support interactions between customer 100 and runtime business system 102 by providing organized access to interaction context information available in raw form in the transaction databases 122. A customer may be involved in a series of interactions that are all related. For example, the customer may initiate a business transaction in writing by mail. Later the customer may call an automated telephone system to check the status of the transaction and in the process of interacting with the automated system need to be transferred to a live agent who in turn transfers the customer to another agent. At some later date, the transaction may finally be completed. Customer interaction tracking system 130 supports data access in which such related interactions are tied together rather than being simply organized as a set of independent interactions with or related to a particular customer.

Transaction systems 120 may require a relatively small amount of customization to address the requirements of a particular business. However, the nature of an interaction context is, in general, much more specific to a business. In addition, the nature of an interaction context may evolve over time as the needs of the business change or become well defined. Customer interaction tracking system 130 therefore must be easily customized.

Customization of customer interaction tracking services 130 is specified by business analysts 140 who are familiar with the requirements of the business system. This specification is processed in customization system 142 offline prior to use in runtime system 102. Customer interaction tracking system 130 operates online according to the customization. Aspects of such customization can include introduction of additional entities, relationships, and attributes not represented in transaction databases 122, and specification of various processing rules and procedures for processing information available in transaction databases 122 or stored internally in the customer interaction tracking system.

Figure 2:
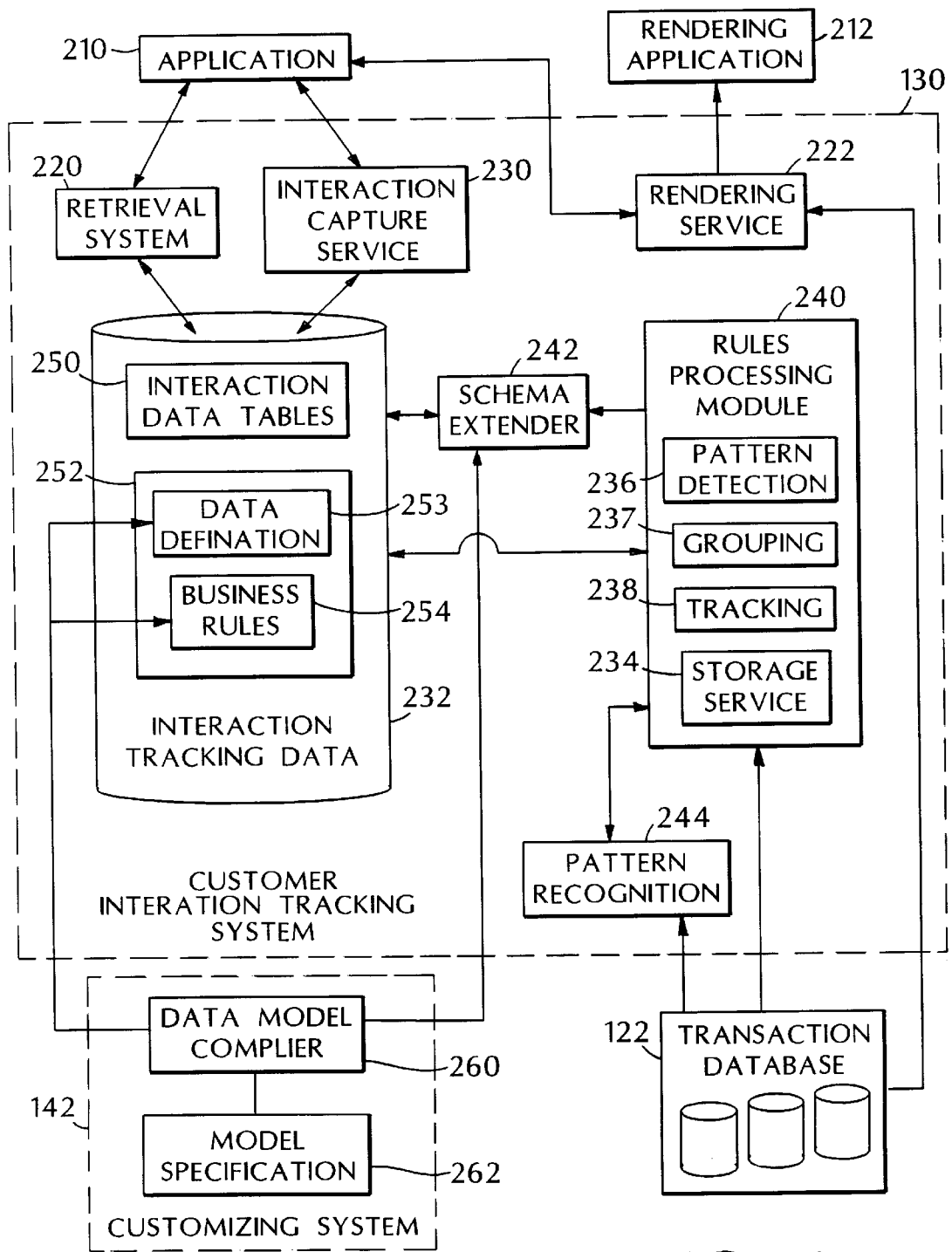
FIG. 2 shows elements of a customer interaction tracking system.

Referring to FIG. 2, customer interaction tracking system 130 includes several components that support an external application 210. Application 210 may be part of a variety of systems shown in FIG. 1, including automated telephone system 110, mail processing system 112, a module of online application 114, or part of agent system 116. Application 210 interacts with the customer interaction tracking system through three modules that are part of customer interaction tracking system 130: retrieval service 220, interaction capture service 230, and rendering service 222. Application 210 makes a request to retrieve particular information using retrieval services 220. For example, application 210 may be used by an agent while interacting with a customer over the telephone and a request may be made to provide a summary of recent interactions with that customer. Interaction tracking data 232 contain information that is accessed by retrieval services 220 and provided to application 210 in response to the requests. Interaction tracking database 232 includes references to information in transaction databases 122. Information in transaction databases 122 does not therefore have to be duplicated. In order to resolve a reference to a transaction record in transaction databases 122, a request is made by application 210 of rendering service 222 which in turn accesses transaction databases 122. If necessary, a rendering application 212, such as a display application for a scanned image or an audio playback facility for an audio telephone recording, is used as an adjunct to application 210. In addition to retrieving information from the interaction tracking database, application 210 can provide information to interaction tracking data 232 through interaction capture service 230.

Retrieval service 220 and interaction capture service 230 access interaction data tables 250 in interaction tracking database 232 through objects that encapsulate direct database requests (e.g., using SQL commands). Various commercially available database access tools could also be used to make queries. Application 210 is aware of standard schema in interaction data tables 250. In addition, it may be aware of customized schema in the tables. Customization of these schema is described further below.

Interaction tracking data 232 hold data and customization information that is particular to the business making use of the system. Interaction tracking data 232 include interaction data tables 250 and meta data 252. Meta data 252 include data definitions 253 that describe classes of entities and relationships between these entities. Both entities and relationship data are stored in interaction data tables 250. Meta data 252 also include business rules 254 which are used to access and modify data in interaction data tables 250. Meta data 252 are created offline by customization system 142.

Customer interaction tracking system 130 makes use of meta data 252 to provide some of its customized operating characteristics. In addition, interaction data tables 250 are modified to support customized features and data definitions. In particular, schema extender 242 modifies interaction data tables 250 by creating new tables, or by adding additional fields to existing tables. Customization system 142 drives schema extender 242 to customize interaction data tables 250.

Customization system 142 includes data model compiler 260 which is used to process a data model specifications 262 provided by business analysts 140 (shown in FIG. 1). Customization system 142 provides meta data 252 stored in interaction tracking data 232. Customization system 142 is also used to drive schema extender 242 to extend interaction data tables 250 consistently with meta data 252.

Figure 3:
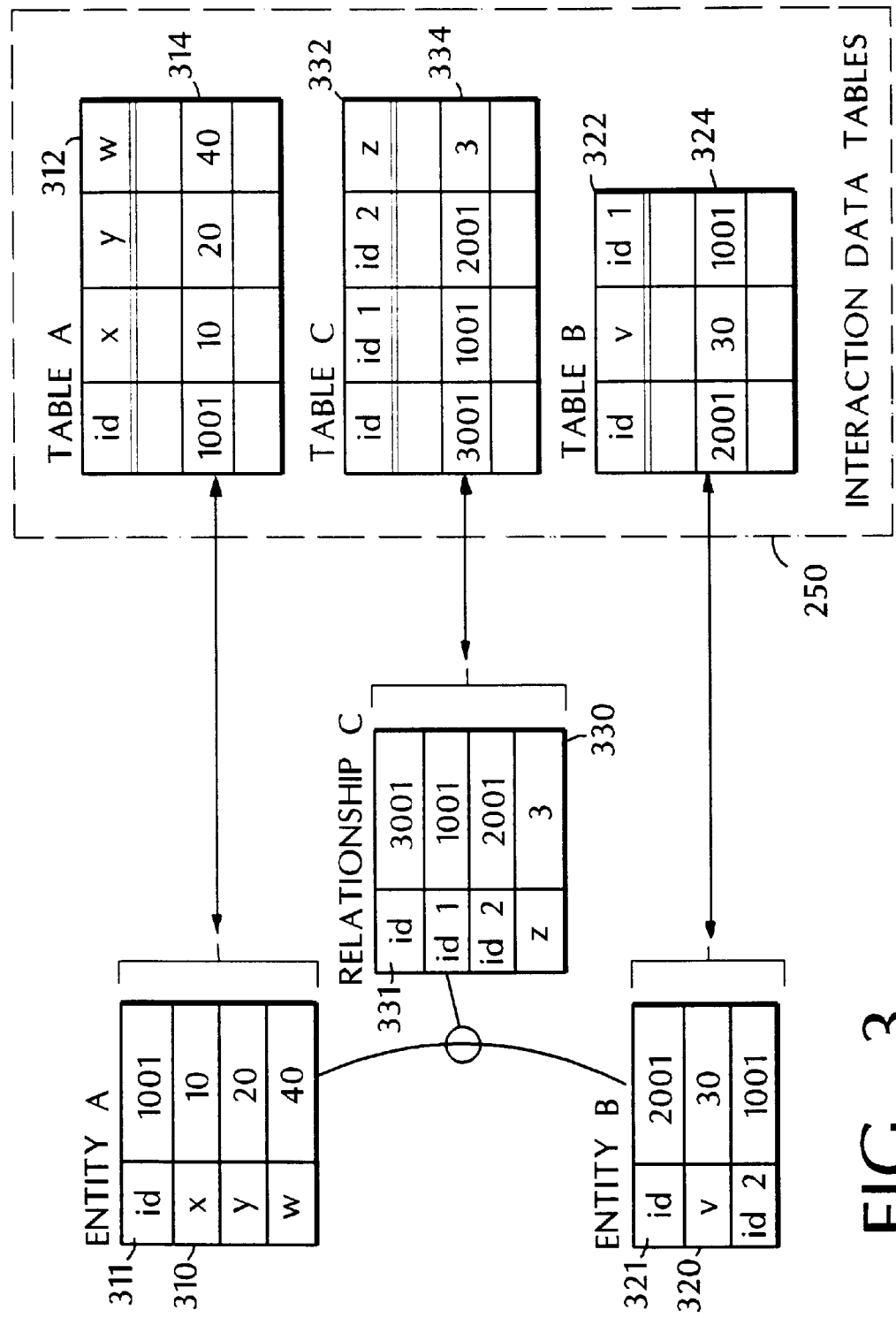
FIG. 3 illustrates entity and relationship data models and associated database tables.

Data model specification 262 includes definition of custom classes of data entities and relationships between entities. Each class of data entity, and some classes of relationships, are associated with tables in interaction data tables 250. Data definitions 253 in meta data 252 stored in interaction tracking data 232 represent both the definitions of the classes of entities and relationships, as well as the associations with particular tables in interaction data tables 250. Referring to FIG. 3, an entity of class A 310, an entity of class B 320, and a relationship of class C 330 are shown to illustrate the association of entities and relationships with data tables. Entities 310, 320 and relationship 330 include unique identification fields 311, 321, 331 as well as other attribute fields. Each class of entities is associated with a table stored in interaction data tables 250 (shown in FIG. 2). Entities of class A are stored in table A 312 and entities of class B in table B 322. Relationships of the type shown which, in addition to having fields associated with the related entities, also have other attribute fields, are also stored in tables. Relationships of class C are stored in table C 322. In FIG. 3, entity 310 corresponds to a record 314 in table A 312, entity 320 corresponds to record 324 in table B 322, and relationship 330 corresponds to record 334 in table C 332. Access to groups of related entities is accomplished by performing appropriate database operations (such as joins) on the associated database tables. Identifiers of tables used to store various entities and relationships are stored in data definitions 253 (shown in FIG. 2). Not all classes of relationships require separate tables. For example, a hierarchical set of relationships can be represented using reference attributes within entities. Each child entity would include an attribute containing a reference to its parent entity. If attributes are associated with a relationship, however a separate table is needed to store the attribute. Separate tables are used for other types of relationships, such as "m-to-n" relationships or arbitrary groupings.

Referring to FIG. 2, customer interaction tracking system 130 also includes rule processing module 240 which is used to add information to interaction tracking data 232 by accessing data already in interaction tracking data 232 or by accessing transaction databases 122 which contain raw transaction information. Rules processing module 240 can access transaction databases 122 directly or make use of recognition technologies 244 to process unstructured information in the transaction databases. Examples of recognition technologies include optical character recognition of scanned documents or of stored faxes, keyword based classification of free text entries, or speech recognition to detect probable occurrences of keywords and possibly to extract more information such as the gist of a conversation. Some of these recognition technologies may not be entirely accurate, but they may provide useful information, for example for purposes such as market segmentation using customer records where individual errors can be tolerated.

Rules processing module 240 makes use of business rules 254 which specify customized aspects of processing within rules processing module 240. In addition, rules processing module 240 use data definitions 253 when processing the business rules in order to access appropriate elements of interaction data tables 250. In particular, data definitions 253 are used to access customized schema of interaction data tables 250.

Rules processing module 240 includes several related modules, including storage services 234, pattern detection module 236, grouping module 237, and tracking module 238. Storage services 234 are used for batch loading of interaction tracking data 232 based on data stored in transaction databases 122. Storage services 234 make use of schema extender 242 if new tables or fields are needed to populate the interaction data tables according to rules 254. Rules that make use of storage services 234 may be triggered in a variety of instances, for example, at initialization of the customer interaction tracking system, or periodically in order to incorporate new information in transaction databases 122. Storage services 234 may merge data contained in separate databases of transaction databases 122. Pattern detection module 236 is used to determine entries in interaction data tables 250. These entries are typically attribute fields of entity or relationship objects represented in those tables. The content of those entries are determined using pattern detection rules that are part of business rules 254. These pattern detection rules are applied to data in interaction tracking database 232, in transaction databases 122, or extracted from transaction databases 122 using recognition technologies 244. Grouping module 237 uses information already stored in interaction tracking data 232 to determine entries in interaction data tables 250. These entries are typically related to relationships between objects represented in those tables. Tracking module 238 in rules processing modules 240 also makes use of information in interaction tracking data 232 to add entries in interaction data tables 250. These entries are typically related to tracking the time course of a sequence of interactions.

Pattern detection module 236 retrieves information from transaction databases 122 and from information tracking data 232 and provides additional information to information tracking data 232. The processing in pattern detection service 236 is driven by business rules 254 that are provided by customization system 142 in response to the input of business analysts 140 as shown in FIG. 1. Pattern detection module 236 performs a variety of actions, including determination of attribute values for entities and relationships stored in interaction data tables 250. The pattern detection phase, often called "data mining," can occur off-line in a batch processing mode, or on-line while, or shortly after, data are entered into interaction data tables 250. In both the off-line and the on-line case, the output of pattern detection module 236 is stored in the interaction tracking databases itself and is therefore available for interactive, on-line, use by application 210.

Tracking module 238 is similar to pattern detection module 236 except that data are discovered based on multiple records rather than being extracted from a single record. Tracking module 238 detects temporal patterns of events, again driven by business rules 254. For example, if a common interchange with a customer requires a series of several individual interactions with that customer, a data entity may be defined to track the series of interactions. Tracking module 238 would then be used to associate a new interaction with any relevant data entities being used to track an interchange that that interaction is a part of. In addition, a finite state model of such a series of interactions can be used and the current state updated as new interactions are processed. Examples of use of tracking module 238 include associating a request for information about a product by a customer with a subsequent purchase of the product by that customer. Other types of temporal tracking may be based on a model of a typical series of interactions with a customer. As customer interactions and events occur, the state of the model is tracked. If an unexpected event occurs, or if an expected event does not occur, that customer can be flagged. Tracking module 238 can be useful in identifying sales opportunities or detecting situations in which a sequence of interactions with a customer might indicate that the customer is not satisfied.

Grouping module 237 is also related to tracking module 238 and pattern detection module 236. Like tracking module 238, grouping module 237 is used to associate various entities stored in interaction data tables 250, again driven by business rules 254. For example, interactions related to a particular product might be grouped.

The pattern detection, grouping, and tracking procedures can be triggered by particular events to or can be run periodically. Events can include creation of an instance of an entity or relationship object, or assign a value to an attribute field of an existing object. For example, a change-of-employer customer event may trigger inclusion of the customer in a check-for-new-work-telephone-number group. Grouping can also be used to identify customers that belong to a particular market segment or otherwise share a common attribute. For example, based on transaction histories, certain customers might be identified as belonging to a sales-prospect group.

Business rules 254 can be customized to accommodate different situations. For example, the rules might be used to detect a particular class of sales prospects. In addition, for keyword based pattern detection, the mapping for English word patterns to attribute values may be specified. In the latter case, the format of the rules may depend on particular pattern detection tools that are incorporated into pattern detection services 236. However, modification of the customer interaction tracking system 130 is not needed in order to introduce new pattern detection logic.

Figure 4:
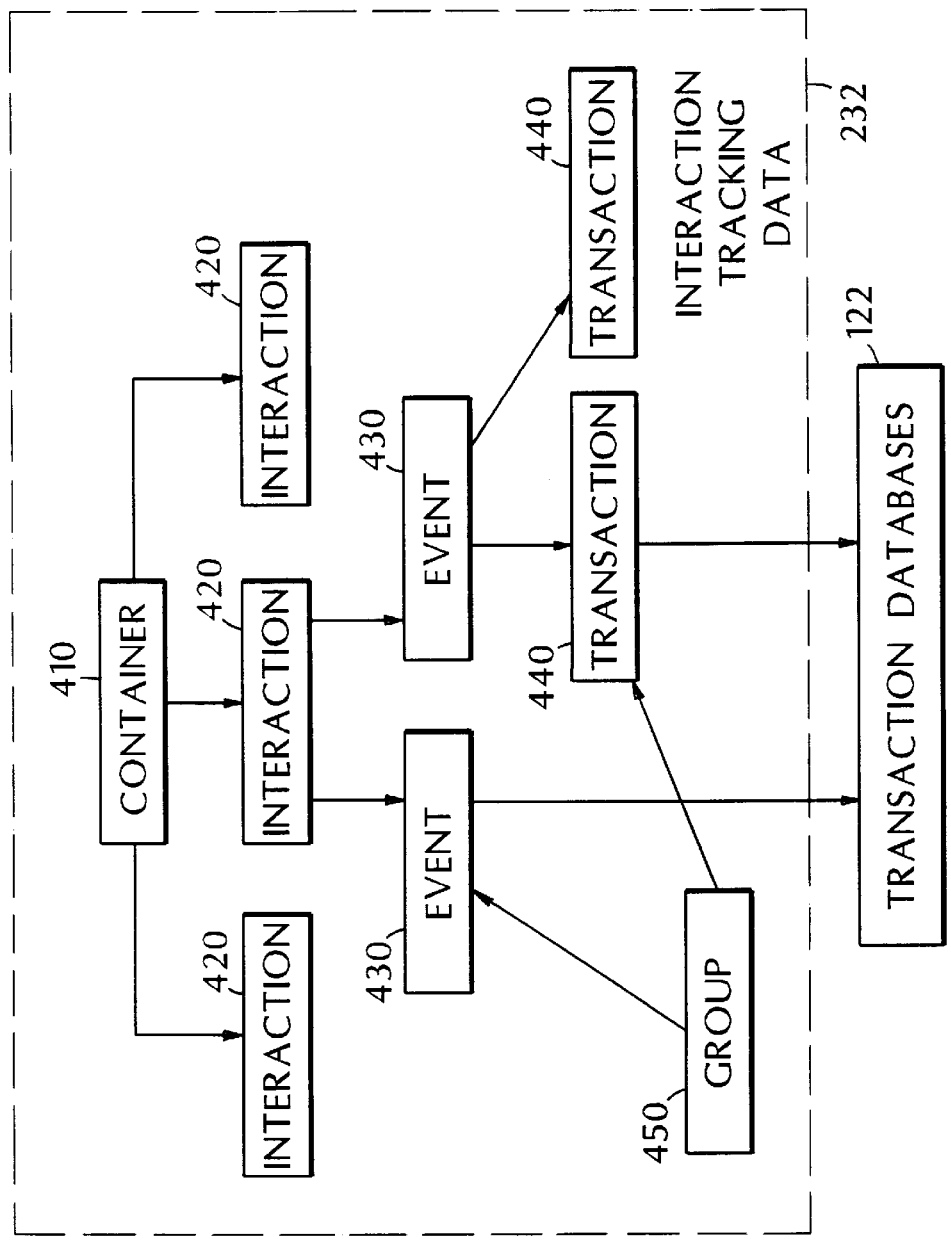
FIG. 4 illustrates exemplary entity and relationship data models for customer interactions.

An exemplary customization of the customer interaction tracking system 130 is shown in FIG. 4. The instances of entities and relationships shown are stored in interaction tracking data 232. In this example, data entities are defined for elements of a customer interaction history both smaller than a particular conversation or telephone call, as well as for elements that may span many such interactions. A hierarchical organization of data is used. A set or series of interactions are grouped together in a "container" object 410. Such a container may correspond to the series of interactions that make up an entire interchange with a customer or may correspond to a physical grouping such as mail received in a particular box from the post office. An interaction object 420 is associated with a single encounter with a customer, for example a telephone call where a customer first interacts with an automated telephone system and then with a series of two agents would be represented by a single interaction object. An event object 430 is associated with one such conversation with an agent. The finest-grain record in the database is a transaction object 440 which corresponds, for example, to a specific request made by the customer during the conversation with the agent. Separate from this hierarchical organization of interaction events, a group object 450 can be defined to associate elements such as a set of transactions or events. Groups are typically associated with business concepts or procedures rather than being associated with physical events. For example, a group may be defined to be a set of events that occur during a particular time period. In addition, an event 430 or a transaction 440 may refer to data in interaction databases 122 that contains details related to the event or transaction.

An example of use of customer interaction tracking system 130 is in the context of a customer talking to an agent. The customer inquires about a particular business transaction, in this example the purchase of a security. The agent's application retrieves a history of recent transactions for that customer using retrieval services 220. The customer wants to know why the security was bought at a particular price. The agent scans the transaction history for a transaction related to the purchase. One transaction corresponds to the order placed in a previous telephone conversation. The agent's application requests from the rendering services 222 that the logged telephone call containing the order be played in order to confirm that the customer's instructions were followed. Finally, a record of the current interaction is sent to interaction capture service 230 which saves the record. A business rule executes to associate the new record with the transaction inquired about.

In another example, customer interaction tracking system 130 is used to determine if a customer is justified in complaining about the response time for his mailed requests. A search is done "for this account show all information about mail received in the past year about purchases or account transfers to which a response was not sent within two weeks." Since the tracking component of the pattern detection services has associated the initial mail with the response sent out, this type of query is directly supported whereas it may not have been easily supported by transaction databases 122.

Other uses of the customer interaction tracking system are within the scope of the claims. For example, an automated telephone interaction system can modify the flow of the interaction based on the interaction context. Also, a customer can be routed to a particular agent based on the interaction context. Although the above embodiment is described in terms of interacting with a customer, the interaction may be with any "involved party" including a client or sales prospect. The customer does not necessarily initiate the interaction, for example, by calling the business on the telephone. The business may initiate the interaction as part of an outbound telemarketing or direct mailing activity. Furthermore, the scope of the invention is not limited to systems used to processing customer interactions. For example, a workflow processing system could make use of the claimed invention. Other embodiments of the invention are within the scope of the following claims.

What is claimed is:

1. A method of processing an interaction between a customer and a business comprising:

accessing stored information related to interactions with the customer to produce personalized customer information;

storing the personalized customer information in an interaction database;

retrieving the personalized customer information from the interaction database; and automatically interacting with the customer in accordance with the retrieved information;

the interacting including an operator speaking to the customer;

the method further comprising presenting the personalized customer information to the operator.

2. The method of claim 1 wherein automatically interacting with the customer includes communicating with the customer by voice over a telephone channel.

3. The method of claim 1 wherein automatically interacting with the customer includes communicating with the customer over a data channel.

4. The method of claim 3 wherein the data channel is a data network.

5. A method of processing an interaction between a customer and a business comprising:

accessing stored information related to interactions with the customer to produce personalized customer information;

storing the personalized customer information in an interaction database;

retrieving the personalized customer information from the interaction database; and automatically interacting with the customer in accordance with the retrieved information, by determining a destination to which to route a telephone call with the customer; and routing the telephone call to that destination.

6. A method comprising, accessing stored information related to interactions with a customer to produce personalized customer information; the personalized customer information including a characterization of previous interactions with the customer;

storing the personalized customer information from the interaction database;

retrieving the personalized customer information from the interaction database; and interacting with the customer in accordance with the retrieved information.

7. The method of claim 6 wherein the personalized customer information includes an indication of the customer's membership in a defined group of customers.

8. A method comprising:

detecting patterns in elements of the stored information related to interactions with a customer producing personalized customer information in accordance with the detected patterns;

storing the personalized customer information in an interaction database;

retrieving the personalized customer information from the interaction database; and interacting with the customer in accordance with the retrieved information.

9. The method of claim 8 wherein the elements of the stored information include a natural language text passage, a stored image, or an audio recording.

10. A method comprising:

grouping elements of stored information related to interactions with a customer to produce personalized customer information, the personalized customer information including a reference to the group of elements formed;

storing the personalized customer information in an interaction database;

retrieving the personalized customer information from the interaction database; and interacting with the customer in accordance with the retrieved information.

11. A method comprising:

tracking a series of interactions with a customer that occurred at different times;

producing personalized customer information in accordance with a state of the tracked series of interactions;

storing the personalized customer information in an interaction database;

retrieving the personalized customer information from the interaction database; and interacting with the customer in accordance with the retrieved information.

12. A method for customized interaction processing comprising:

accepting meta data;

structuring data stored in an interaction database in accordance with the meta data;

storing rules specified by the meta data;

processing stored interaction information in accordance with the stored rules; and storing in the interaction database in accordance with the meta data the result of processing the stored interaction information.

13. The method of claim 12 wherein the interaction database includes a relational database and structuring the data includes extending the schema of the relational database.

14. The method of claim 13 further comprising:

accepting a meta data specification; and compiling the meta data specification to produce the meta data.

15. The method of claim 13 further comprising accessing the relational database using the extended schema.

16. The method of claim 12 further comprising determining which stored interaction information can be processed in accordance with one of the stored rule.

17. The method of claim 16 further comprising interacting with a customer, and wherein the determining and processing are performed during the interacting.

18. The method of claim 12 wherein the stored rules include rules defining unexpected events, and the method further includes:

interacting with a customer;

entering information about events involving the customer; and determining whether an event involving the customer is unexpected in accordance with the stored rules.

19. A method for arranging references to stored interaction information in disparate databases comprising:

storing transaction records each referencing one or more records in the disparate databases;

grouping the transaction records into groups;

storing event records each referencing one of the groups of transaction records;

grouping the event records into groups;

storing interaction records each referencing one of the groups of event records;

grouping the interaction records into groups;

storing container records each referencing one of the groups of related interaction records; and accessing a record in one of the disparate databases in accordance with references in a container or an interaction record.

20. The method of claim 19 wherein the disparate databases include a text passage, a stored image, or an audio recording;

storing transaction records each referencing one or more records in the disparate databases;

grouping the transaction records into groups;

storing event records each referencing one of the groups of transaction records;

grouping the event records into groups;

storing interaction records each referencing one of the groups of event records;

grouping the interaction records into groups;

storing container records each referencing one of the groups of related interaction records; and accessing a record in one of the disparate databases in accordance with references in a container or an interaction record.

21. The method of claim 19 further comprising deleting transaction or event records wherein the transaction or event records are accessed through a single interaction or container record.

22. A system for interacting with a customer comprising:

stored transaction information related to interactions with the customer; and an interaction database including personalized customer information obtained by mining accessing the stored information further comprising an automated system which controls an interaction with the customer, wherein the automated system controls the interaction in accordance with the personalized customer information.

23. The system of claim 22 further comprising an agent application, wherein the personalized customer information is presented through the agent application to an agent interacting with the customer.

24. The system of claim 22 wherein the automated system includes an automated telephone interaction system which communicates with the customer by voice over a telephone channel.

25. The system of claim 22 wherein the automated system further includes a telephone call router wherein a telephone call with the customer is routed according to the personalized customer information.

26. The system of claim 22 wherein the automated system includes an online application used to communicate with the customer over a data channel.

27. The system of claim 22 wherein the personalized customer information includes a characterization of previous interactions with the customer.

28. The system of claim 22 wherein the personalized customer information includes an indication of the customer's membership in a specified group of customers.

29. The system of claim 22 wherein the stored information includes a natural language text passage.

30. The system of claim 2 wherein the stored information includes an audio recording.

31. The system of claim 22 wherein the stored information includes a stored image.

32. A system for interacting with a customer comprising:

stored transaction information related to interactions with the customer; and an interaction database including personalized customer information obtained by accessing the stored information; and further comprising a pattern recognizer for detecting patterns in elements of the stored information.

33. A system for interacting with a customer comprising:

stored transaction information related to interactions with the customer; and an interaction database including personalized customer information obtained by accessing the stored information; and wherein the stored information includes elements grouped during mining the stored information, and wherein the personalized customer information includes a reference to the plurality of elements.

34. A system for customized interaction processing comprising:

stored information related to interactions with the customer; and an interaction database including meta data and interaction data, wherein an arrangement of the interaction data is specified by the meta data;

wherein the meta data includes processing rules, and wherein the interaction data includes the result of processing the stored information according to the processing rules.

35. The system of claim 34 wherein the interaction database includes a relational database and the arrangement of stored data includes the schema of the relational database.

36. The system of claim 34 further comprising a data model compiler, and wherein the meta data includes compiled meta data produced by the data model compiler.

37. The system of claim 34 wherein the processing rules includes rules defining unexpected event.

38. Customer interaction data stored on a computer readable medium and referencing disparate databases, the data comprising:

- transaction records each referencing one or more records in the referencing disparate databases;
- groups of transactions records each corresponding to a group of transaction records;
- event records each referencing one of the groups of transaction records;
- groups of event records each corresponding to a group of event records;
- interaction records each referencing one of the groups of event records;
- groups of related interaction records; and
- container records each referencing one of the groups of related interaction records.

39. A computerized system for processing an interaction between a customer and a business, the system programmed to perform the functions of:

- accessing stored information related to interactions with the customer to produce personalized customer information;
- storing the personalized customer information in an interaction database;
- retrieving the personalized customer information from the interaction database; and
- interacting with the customer in accordance with the retrieved information.

40. A computerized system for customized interaction processing, the system programmed to perform the functions of:

- accepting meta data;
- customizing an interaction database such that the structure of data stored in the interaction database is specified by the meta data;
- storing rules specified by the meta data;
- processing stored interaction information in accordance with the stored rules; and
- storing in the customized interaction database in accordance with the meta data the result of processing the stored interaction information.

* * * * *